United States Patent
Bergey

(10) Patent No.: US 12,474,244 B2
(45) Date of Patent: Nov. 18, 2025

(54) METHOD FOR DILINOLEIC ACID EXTRACTION AND ELUTION

(71) Applicant: United States of America, as represented by the Secretary of the Navy, Patuxent River, MD (US)

(72) Inventor: N. Scott Bergey, St. Leonard, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 525 days.

(21) Appl. No.: 18/121,304

(22) Filed: Mar. 14, 2023

(65) Prior Publication Data

US 2024/0310256 A1    Sep. 19, 2024

(51) Int. Cl.
*G01N 1/34* (2006.01)
*G01N 1/40* (2006.01)

(52) U.S. Cl.
CPC ............. *G01N 1/4055* (2013.01); *G01N 1/34* (2013.01); *G01N 2001/4061* (2013.01); *G01N 2001/4088* (2013.01)

(58) Field of Classification Search
CPC .................. G01N 1/4055; G01N 1/34; G01N 2001/4061; G01N 2001/4088
See application file for complete search history.

(56) References Cited

U.S. PATENT DOCUMENTS

2021/0363514 A1* 11/2021 Lee .................. B01L 3/5023

* cited by examiner

*Primary Examiner* — Jill A Warden
*Assistant Examiner* — Michael Stanley Gzybowski
(74) *Attorney, Agent, or Firm* — Mark O. Glut; NAWCAD

(57) ABSTRACT

A method for dilinoleic acid extraction and elution that includes the steps of pipetting aviation fuel into a first syringe barrel with a filter; allowing the aviation fuel to flow through the filter into a waste collection vial; pressing on a inserted first syringe plunger such that any remaining volume of fuel is expelled through the filter and into the waste collection vial; removing excess fuel from the filter; affixing the filter to a second syringe barrel; pipetting a polar organic solvent into the second syringe barrel and allowing the polar organic solvent to flow through the filter into a sample collection vial; expelling remaining volume of the polar organic solvent through the filter and into the sample collection vial; homogenizing contents of the sample collection vial; and, measuring concentration of dilinoleic acid in the volume in the sample collection vial.

1 Claim, No Drawings

METHOD FOR DILINOLEIC ACID EXTRACTION AND ELUTION

STATEMENT OF GOVERNMENT INTEREST

The invention described herein may be manufactured and used by or for the Government of the United States of America for governmental purposes without payment of any royalties thereon or therefor.

BACKGROUND

A corrosion inhibitor/lubricity improver ("CI/LI") additive is a formulation that contains dilinoleic acid ("DLA") and hydrocarbons. The hydrocarbons in CI/LI are indistinguishable from those found naturally in fuel, so all current CI/LI measurement techniques target DLA to determine the concentration of CI/LI that was added to the fuel. The most common method employed to measure CI/LI is liquid chromatography-mass spectroscopy ("LC-MS"), which targets DLA by its uniquely large molecular weight, but LC-MS is many years away from achieving inexpensive and reliable field-portable units. Size exclusion chromatography with refractive index detection has also been utilized with moderate success, but this methodology also cannot be utilized in-field due to the complexity of the required sample preparation steps. Other proposed methods for measuring DLA using readily portable instrumentation target the carbon-oxygen (C—O), carbonyl (C=O), and/or hydroxyl (O—H) bonds in its carboxylic acid groups for direct spectroscopic measurement or chemical tagging, but these same bonds are present in the acids and other oxygenates that occur naturally in petroleum fuels, often at concentrations similar to or greater than the concentration that CI/LI is added to fuel. Thus, field measurement of CI/LI concentrations will likely require isolation of the DLA from the fuel matrix. DLA can be separated from the fuel using solid phase and liquid-liquid extraction techniques. Both of these techniques, however, also result in the extraction of all other oxygen containing species that naturally occur in fuel. The resulting extracts are rich in molecules that have C—O, C=O, and O—H bonds, and the DLA signature gets lost among the more abundant naturally-occurring oxygenate species.

Additionally, there is a need to isolate the DLA active ingredient from military aviation fuel such that it can be quantified by portable analytical techniques. CI/LI is an additive that is added to military aviation fuels to ensure proper fuel lubricity as the fuel flows through an aircraft fuel system. Improper additization levels create a safety risk for aircraft, and fuel specifications require precise CI/LI concentrations. Under contingency operation scenarios where military specification fuel is unavailable and commercial-grade fuel must be additized, samples must be shipped to advanced laboratories to perform testing to validate that the CILI concentration meets the specified level. There are currently no means to effectively measure CI/LI outside of the laboratory setting. Development of an inexpensive portable CI/LI measurement technique would allow for CI/LI quantification at the airfield, which would speed fuel validation decisions.

There have been attempts to develop a CI/LI measurement probe on a spectrometer device, but the methodology has only been demonstrated on clean kerosene samples. It is anticipated that this system will not provide reliable results on aviation fuels due to the interferences from naturally occurring oxygenates.

SUMMARY

The present invention is directed to a method for dilinoleic acid extraction and elution with the needs enumerated above and below.

The present invention is directed to a method for dilinoleic acid extraction and elution comprising the steps of affixing a filter to a first syringe barrel having a detachable first syringe plunger; pipetting aviation fuel containing a corrosion-inhibitor/lubricity-improver additive into the first syringe barrel; allowing the aviation fuel to flow through the filter via gravity filtration into a waste collection vial; inserting the first syringe plunger into the first syringe barrel; pressing on the inserted first syringe plunger such that any remaining volume of fuel is expelled through the filter and into the waste collection vial; removing the filter from the first syringe barrel and tapping the filter such that excess fuel is removed; affixing the filter to a second syringe barrel having a detachable second syringe plunger; pipetting a polar organic solvent into the second syringe barrel and allowing the polar organic solvent to flow through the filter via gravity filtration into a sample collection vial; inserting the second syringe plunger into the second syringe barrel; pressing on the second syringe plunger such that any remaining volume of the polar organic solvent is expelled through the filter and into the sample collection vial; homogenizing contents of the sample collection vial; and, measuring concentration of dilinoleic acid in the volume in the sample collection vial.

It is a feature of the present invention to provide a method for dilinoleic acid extraction and elution such that the concentration of corrosion inhibitor/lubricity improver additive can be quantified.

It is a feature of the present invention to provide a method for dilinoleic acid extraction and elution that is inexpensive and portable.

It is a feature of the present invention to provide a method for dilinoleic acid extraction and elution that selectively separates dilinoleic acid from the naturally-occurring acids and oxygenates in fuel.

It is a feature of the present invention to provide a method for dilinoleic acid extraction and elution that can be performed by an operator without advanced chemistry knowledge and experience.

It is a feature of the present invention to provide a method for dilinoleic acid extraction and elution that does not require storage nor disposal of large quantities of hazardous materials.

It is a feature of the present invention to provide a method for dilinoleic acid extraction and elution that takes less than five (5) minutes.

It is a feature of the present invention to provide a method for dilinoleic acid extraction and elution that consumes less than about fifty (50) mL of fuel.

It is a feature of the present invention to provide a method for dilinoleic acid extraction and elution that could be upgraded to an automated system but retains the fallback option of manual execution.

It is a feature of the present invention to provide a method for dilinoleic acid extraction and elution that can be executed by a single operator.

The present invention will be used in contingency operation scenarios when commercial-grade fuel must be additized with military additives to validate that the proper concentration of CI/LI was uptaken by the fuel during additization.

The present invention has additional potential benefits and applications across the Department of Defense ("DoD") and commercial industry.

DESCRIPTION

The preferred embodiments of the present invention are illustrated by way of example below. The method for dilinoleic acid extracting and elution includes the steps of affixing a filter to a first syringe barrel having a detachable first syringe plunger; pipetting aviation fuel containing a corrosion-inhibitor/lubricity-improver additive into the first syringe barrel; allowing the aviation fuel to flow through the filter via gravity filtration into a waste collection vial; inserting the first syringe plunger into the first syringe barrel; pressing on the inserted first syringe plunger such that any remaining volume of fuel is expelled through the filter and into the waste collection vial; removing the filter from the first syringe barrel and tapping the filter such that excess fuel is removed; affixing the filter to a second syringe barrel having a detachable second syringe plunger; pipetting a polar organic solvent into the second syringe barrel and allowing the polar organic solvent to flow through the filter via gravity filtration into a sample collection vial; inserting the second syringe plunger into the second syringe barrel; pressing on the second syringe plunger such that any remaining volume of polar organic solvent is expelled through the filter and into the sample collection vial; capping the sample collection vial and shaking the sample collection vial such that contents of the sample collection vial is homogenized; and, measuring concentration of dilinoleic acid in the volume in the sample collection vial.

In the description of the present invention, the invention will be discussed in a military environment; however, this invention can be utilized for any type of application that needs a method for dilinoleic acid extraction and elution.

In a preferred embodiment of the invention, the filter is a Luer lock syringe filter with a 0.7 µm porosity borosilicate glass microfiber membrane. Furthermore, the invention may expel remaining volume of fuel and/or polar organic solvent disposed within the filter in any other means practicable, and the sample collection vial can be agitated in any other means such that the contents within is homogenized.

In a preferred embodiment of the invention, the syringe barrel is a borosilicate glass syringe with a male Luer tip/lock. However, any glass syringe, syringe from another material, or syringe barrel that is practicable can be used. A Luer lock, but without limitation, is a connector that includes a twist lock mechanism to hold the connector. A Luer lock allows a filter to be screwed into the tip of the syringe and securely locked so no liquids can leak. The polar organic solvent may be, but without limitation, ethanol, isopropanol, methanol, or any other solvent, solution, composition, or chemical practicable. Preferably, the filter may be a glass microfiber membrane. However, the filter may be any type of filter that extracts dilinoleic acid but does not extract any other oxygenates.

Syringes or syringe barrels that are not pre-washed may contain lubricants that can interfere with downstream measurement, so the preferred method requires the syringe barrels to be prewashed.

In another embodiment of the invention, after the first syringe plunger is first fully pressed, a user may twist the filter to disengage the Luer lock. The next step includes pulling the first syringe plunger to about the five (5) mL mark marking, then reinstalling the filter, pressing the first syringe plunger to expel the five (5) mL of air through the filter and into the waste collection vial. In another embodiment, the process includes repeating this process two (2) more times for a total of three (3) pumps of air.

Preferably, the method requires removal of the filter from the first syringe barrel, and lightly tapping the outlet of the filter onto a laid out paper towel (or any other practicable material) to absorb excess residual fuel. However, as stated earlier, any other method that is practicable and removes excess residual fuel may be utilized. The dilinoleic acid from the CI/LI in the fuel remains trapped on/in the filter during this residual fuel purging.

After the second syringe plunger is first fully pressed, another embodiment includes twisting the filter to disengage the Luer lock and pulling the second syringe plunger to about the two (2) mL mark marking, then reinstalling the filter, and pressing the second syringe plunger to expel the two (2) mL of air through the filter and into the sample collection vial. Preferably, as with the first syringe plunger, this process is repeated two (2) more times for a total of three (3) pumps of air to elute all polar organic solvent from the filter. However, the process in both cases may be done only once or more than three times.

In yet another embodiment of the invention, the method includes shaking the sample collection vial aggressively for two (2) minutes to fully homogenize the polar organic solvent with the dilinoleic acid and the residual fuel that remained trapped in the hold-up volume of the filter's pores. However, as stated earlier, any method that homogenizes the polar organic solvent with dilinoleic acid can be utilized. At this point, the volume in the sample collection vial is ready for downstream analysis. Depending on the embodiment used, the final mixture contains at least about a >20x increase in the relative abundance of dilinoleic acid versus its measurement interferants.

In one of the preferred embodiments, the concentration of dilinoleic acid is measured via portable turbidimetry, portable spectrometry, or lateral flow device. The extract solution can be mixed with water and shaken aggressively to create an emulsion between the water and the suspended droplets of residual fuel. The dilinoleic acid in the extract solution acts as an emulsifier, and the aqueous mixture's turbidity can be measured to quantify the concentration of dilinoleic acid in the emulsion. The extract solution may also be measured by portable infrared ("IR") spectrometry because the dilinoleic acid will be the only component present in the solution that contains a carbonyl (C=O) bond at detectable concentrations, and the infrared absorbance of the C=O stretching vibration is an intense signal around 1700 $cm^{-1}$, a region of the IR spectrum that is clear from interference from the polar organic solvent or residual fuel molecules. The dilinoleic acid concentration in the solution may also be measured by reacting the carboxylic acid groups with transition metal salts such that the dilinoleic acid forms a chemical complex with the transition metal that induces a color or ultraviolet absorbance change that can be measured via portable ultraviolet-visible spectrometry. The dilinoleic acid concentration in the solution may also be measured by reacting the carboxylic acid groups with a fluorophore and then inducing a fluorescent excitation that can be measured via portable fluorimetry. The dilinoleic acid concentration in the extract solution can also be measured using a lateral flow device that has deoxyribonucleic acid ("DNA") aptamers with binding specificity for dilinoleic acid layered onto the device at different levels such that a series of vertical lines will appear and/or change color when the solution contains minimum, target, and maximum levels of dilinoleic acid. The presence of these lines indicates the concentration: zero lines represents insufficient concentration, one or two lines represents concentrations within the acceptable range, and three lines indicates over-additization. However, the concentration of dilinoleic acid may be measured by any method practicable.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A method for dilinoleic acid extracting and elution comprising of the steps of:

affixing a filter that extracts dilinoleic acid but does not extract any other oxygenates to a first syringe barrel having a first syringe plunger;

pipetting aviation fuel containing a corrosion-inhibitor/lubricity-improver additive that includes dilinoleic acid into the first syringe barrel and allowing the aviation fuel to flow through the filter via gravity filtration into a waste collection vial;

inserting the first syringe plunger into the first syringe barrel;

pressing on the inserted first syringe plunger such that any remaining volume of fuel in the first syringe barrel is expelled from the first syringe barrel through the filter and into the waste collection vial;

removing the filter from the first syringe barrel and removing any fuel absorbed in the filter;

affixing the filter to a second syringe barrel having a second syringe plunger;

pipetting a polar organic solvent into the second syringe barrel and allowing the polar organic solvent to flow through the filter via gravity filtration into a sample collection vial;

inserting a second syringe plunger into the second syringe barrel;

pressing on the second syringe plunger such that any remaining volume of the polar organic solvent in the second syringe barrel is expelled from the second syringe barrel through the filter and into the sample collection vial;

homogenizing contents within the sample collection vial; and, measuring a concentration of dilinoleic acid in the volume remaining in the sample collection vial.

* * * * *